Feb. 28, 1956 YAZO HIGASHI ET AL 2,736,239
IRREGULAR GEAR CUTTING APPARATUS
Filed Nov. 30, 1953 3 Sheets-Sheet 1

INVENTORS
Yazo Higashi
Takehiko Mori
BY
Horace B. Van Valkenburgh
ATTORNEY

Feb. 28, 1956  YAZO HIGASHI ET AL  2,736,239
IRREGULAR GEAR CUTTING APPARATUS

Filed Nov. 30, 1953  3 Sheets-Sheet 3

INVENTORS
Yazo Higashi
Takehiko Mori
BY
Horace B. Van Valkenburgh
ATTORNEY

United States Patent Office 2,736,239
Patented Feb. 28, 1956

2,736,239

IRREGULAR GEAR CUTTING APPARATUS

Yazo Higashi and Takehiko Mori, Tokyo, Japan

Application November 30, 1953, Serial No. 395,238

8 Claims. (Cl. 90—3)

This invention relates to apparatus for cutting or forming irregular gears. This application is a continuation-in-part of our application Serial No. 322,679, filed November 26, 1952, and entitled "Irregular Gear Cutting Apparatus," now abandoned.

There are several ways in which gears may be produced from blanks, depending upon the type of gear and whether or not the teeth are straight, curved or extend at an angle to the axis of the gear. For example, spur gear teeth may be cut by milling, in which a circular cutter corresponding to the shape of the space between two teeth is employed; or by shaping, in which a pinion-shaped cutter and the blank are revolved during reciprocation of the cutter; or by hobbing, which is similar to shaping, but in which straight-sided cutter teeth extend irregularly around a hob cylinder. In addition, gear teeth may be cut by a planing or shaping tool operating from a template. Bevel gears, the teeth of which generally taper from one end to the other, may be cut by milling each side of each gear tooth independently, or by employing a generating principle, with one tool or two tools operating simultaneously on opposite sides of each tooth being cut. Internal gears, spiral bevel gears, helical gears and worms may also be produced by adaptations or modifications of the above methods. However, when an irregular gear, such as an oval shaped gear which is to mate with another oval shaped gear, is to be cut, the positioning of the blank accurately and the cutting of the tooth surfaces accurately may involve unduly complicated positioning and indexing devices and/or devices for moving the cutting tool. In addition, since the shape of the space between two adjacent teeth may vary for different positions around the periphery of the gear, several sizes of cutters may be necessary, thus introducing additional cost and possibilities of inaccuracy.

Among the objects of the present invention are to provide novel apparatus for cutting the teeth of irregular gears; to provide such apparatus which is not unduly complicated; to provide such apparatus in which a milling or similar cutter, such as a hob or a rack cutter, may be utilized; to provide such apparatus which will insure that the sides of the teeth will be cut accurately; to provide such apparatus in which indexing is simplified; to provide such apparatus which may be used to cut two irregular gears, which will then mesh satisfactorily with each other; and to provide such apparatus which may be operated without undue difficulty.

Additional objects and the novel features of this invention will become apparent from the description which follows, taken in connection with the accompanying drawings, in which.

Figure 1:
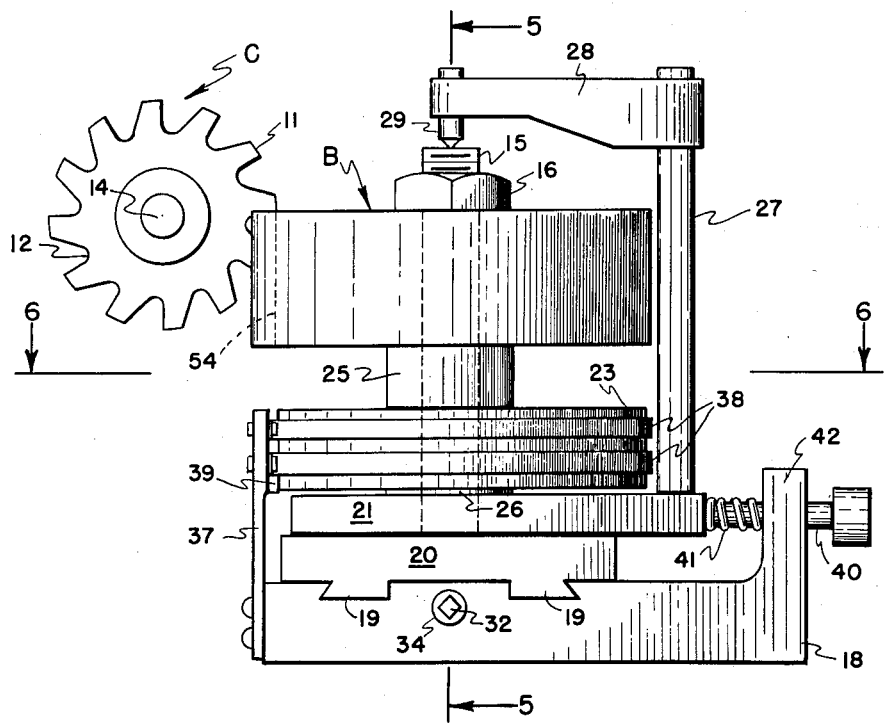
Fig. 1 is an end elevation of apparatus for cutting teeth of irregular gears, constructed in accordance with this invention.
Figure 2:
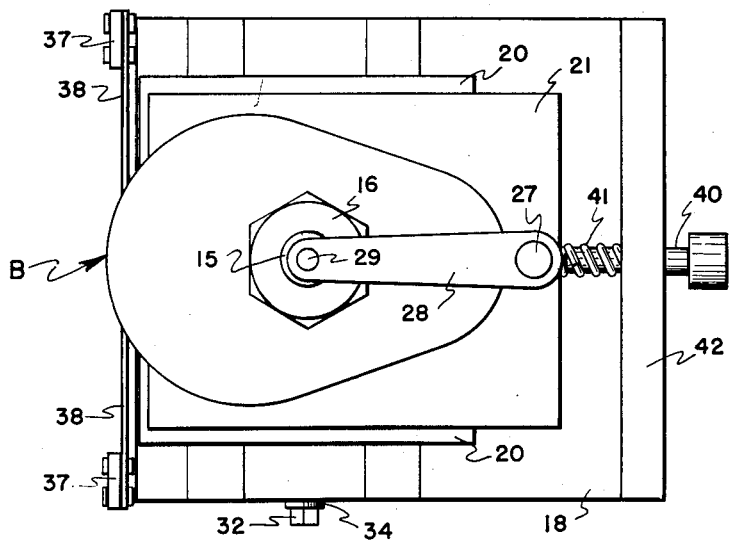
Fig. 2 is a top plan view of the apparatus of Fig. 1, with the cutter omitted.
Figure 4:
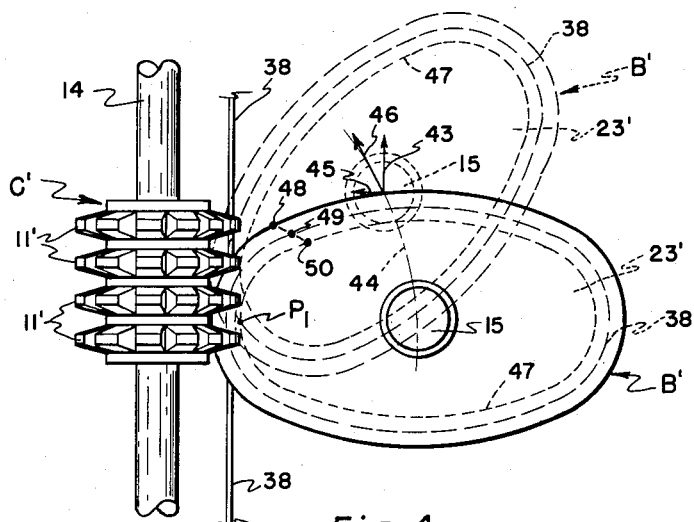
Fig. 4 is a diagram of the operation of the apparatus operating on a blank of slightly different form.

As illustrated in the drawings, a blank B from which an irregular gear is to be cut, may be machined or otherwise suitably formed so that the peripheral edge thereof will correspond in shape to the ends of the gear teeth to be cut from the blank, i. e., the peripheral edge corresponds to the line defining the outer edge of the addendum of the teeth which normally will be a line having a shape similar to that of the pitch circle, i. e., if the latter is an ellipse, the former will be an ellipse having a greater major and minor axis, or the former will be similarly larger if the latter is some other type of curve. The gear blank B shown in Fig. 1 and Fig. 2 is in the form of an ellipsoidal figure whose periphery at one end corresponds to an arc of slightly more than a semi-circle of a larger radius, and whose opposite end corresponds to an arc of slightly less than a semi-circle of a shorter radius, with a line of tangecy between the two arcs. The gear blank B' of Fig. 4 is an ellipsoidal or oval figure symmetrical in form. A gear may be cut from such a blank, so as to mesh with a gear having a corresponding shape, wherein the teeth at the larger end and the smaller end, respectively, of one gear engage the teeth on opposite sides of the other gear, with the gears mounted on parallel axes.

Gear teeth may be cut from the gear blank B by a cutter C, such as a rack cutter provided with a plurality of straight sided projections 11, whose outline corresponds to that of rack teeth having a diametral pitch, addendum, and dedendum corresponding to the teeth to be cut from the blank B, but longer than the depth of the teeth to be cut from the blank. The projections 11 of the cutter C may be provided with lateral slots 12 to form cutting teeth, having sharp edges around their outline, with the surfaces leading from the edges disposed at such angles so that, as the cutter C is rotated on a horizontal shaft 14, the teeth of projections 11 will remove the metal from the gear blank B, which is mounted on a vertical shaft 15, the upper end of which may be threaded to receive a nut 16. In addition, the cutter shaft 14 is mounted for vertical translation, so that it may be reciprocated upwardly and downwardly bodily, and the cutter C along with it.

Figure 3:
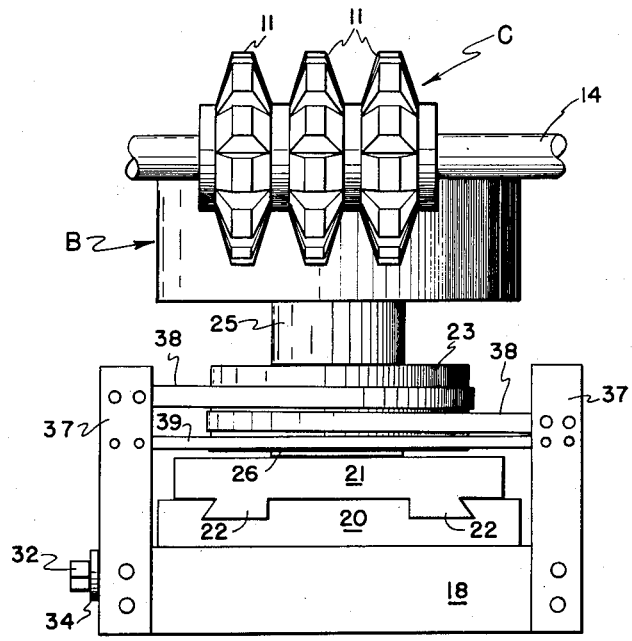
Fig. 3 is a rear elevation of the apparatus of Fig. 1.
Figure 5:
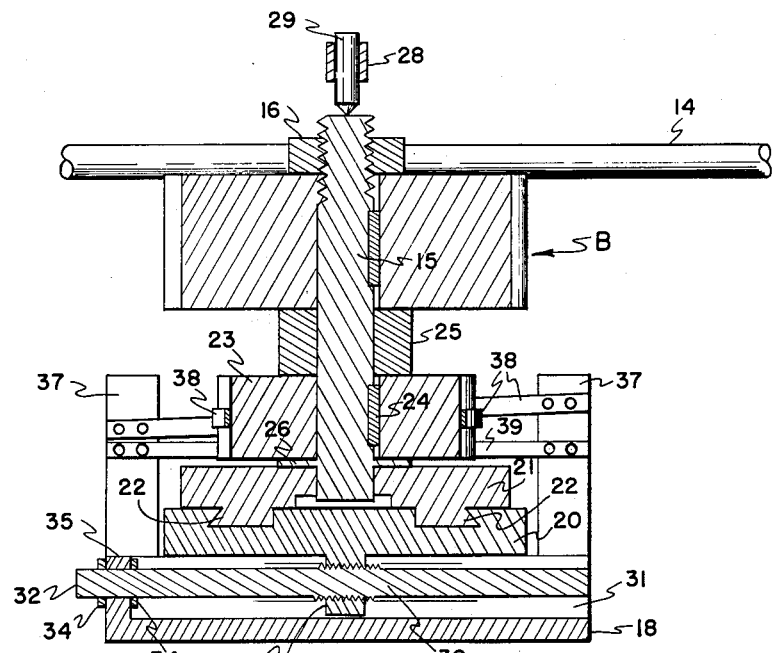
Fig. 5 is a central vertical section taken along line 5—5 of Fig. 1.
Figure 6:
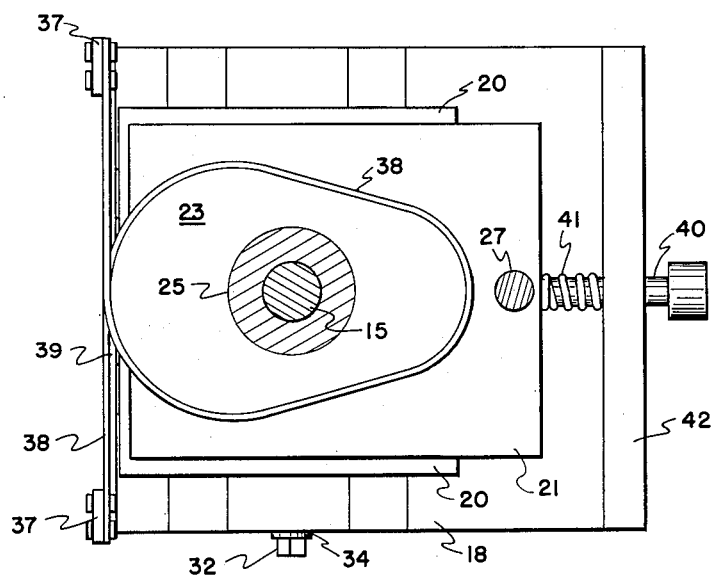
Fig. 6 is a horizontal section taken along line 6—6 of Fig. 1.

The apparatus of this invention may also include a base 18 having grooves extending in a direction parallel to the axis of the cutter shaft 14, to accommodate the ways 19 of a first slide 20. A second slide 21 is mounted on the first slide 20, and is movable thereon in a direction perpendicular to the direction of movement of the first slide, as through grooves provided in the upper surface of the first slide 20 to accommodate ways 22 provided on the underside of the second slide 21, as in Figs. 3 and 5. Shaft 15 is mounted on top of the second slide 21, as in Fig. 5, and a cam 23 is attached in a predetermined position thereto, as by a key 24, while the blank B, from which the gear teeth are to be cut, is mounted above and preferably spaced from the cam 23, as by a block 25. The cam 23 may be spaced from the second slide 21, if desired, as by a flange 26 formed integrally with shaft 15 or attached thereto adjacent its lower end. Cam 23 is machined, or otherwise suitably shaped, so that its periphery corresponds to the pitch curve of the teeth to be cut in the blank B, the blank B and cam 23 being positioned on shaft 15 with the corresponding portions of the noncircular curves thereof in vertical alignment. The shaft 15 is rotatable with respect to the slides 20 and 21, and for this purpose the lower end of the shaft 15 may be received in a circular hole formed centrally in the second slide 21. The upper end of shaft 15 may be maintained in position by a support which may include a post 27, mounted on slide 21 and provided at its upper end with a radially extending arm 28, in turn provided at its inner end with a center 29 which engages the upper end of shaft 15. The gear blank B and cam 23 may be clamped on the shaft 15 by the nut 16, or any other suitable fastening device may be utilized. As will be evident, a blank B and cam 23 may be clamped to shaft 15 prior to placement in the apparatus, as on a bench or in a jig by which the blank and cam may be accurately aligned. Thus, by providing more than one cam and shaft, the next blank to be cut may be mounted on the shaft with the corresponding cam while one blank is being cut, and the cam and blank aligned more readily than after mounting in the gear cutting apparatus. The first slide 20 is movable along its longitudinal path, as by a feed screw 30 of Fig. 5, which is disposed in a lateral slot 31 in the base 18, the head 32 of the screw being rectangular or hexagonal in shape, to permit a socket or other suitable part to be utilized in turning the screw. The threaded body of screw 30 may engage a threaded flange 33 depending from the center of the first slide 20, within the lateral slot 31, while the screw may be restrained from longitudinal movement by collars 34, formed integrally with or removably attached to the screw, and engaging opposite sides of a flange 35 which extends upwardly from the base at the head of slot 31. As will be evident, when the screw 30 is turned in one direction, the slide 20 will be moved in a corresponding direction, while if screw 30 is turned in the opposite direction, the slide 20 will be moved in the opposite direction.

A pair of upstanding arms 37 may be attached to the base 18, at opposite ends and beneath the cutter shaft 14, each of the arms 37 forming a support for a tape 38 which extends from one arm 37, parallel to the axis of shaft 14 (which is also parallel to the path of movement of the first slide 20), then completely around the cam 23 and to the opposite supporting arm 37. The tape 38 is preferably a steel tape, which is stretched tightly around the cam 23 and is fastened securely to each of the arms 37. Arms 37 also provide a support for a guide bar 39 which has a straight guiding edge parallel to the center line of shaft 14 and also in alignment in a vertical direction with the surface of the straight portion of tape 38. As will be evident, if the slide 20 is moved along its path by the screw 30, the steel tape will force the periphery of the cam 23 to follow a path tangential to the line of the steel tape 38 between the supporting arms 37, with the cam 23 in constant tangential contact with guide bar 39 and cam 23 rotating along the surface of guide bar 39.

A guide pin 40, which is surrounded by a spring 41 and which extends to the second slide 21 from a bracket 42 extending upwardly from the base 18, as in Fig. 1, causes the second slide 21 to be pressed toward the tape 38 and the guide bar 39, and the cam 23 and blank B are thereby able to follow the path determined by the tape 38 and guide bar 39. As will be evident, as the first slide 20 is moved, and the longitudinal position of the vertical shaft 16 is changed, the cam 23, and blank B along with it, will rotate with shaft 16. Only one tape 38 may be utilized, as in Fig. 3 and Fig. 5, or two tapes 38, as in Fig. 1. Also, the size of tooth to be cut may vary, such as the larger gear teeth to be cut in blank B of Figs. 1 and 3 by cutter C, or the smaller gear teeth to be cut in blank B' of Fig. 4, by cutting projections 11' of cutter C'. The gear tooth cutting operations are similar for the larger blank B of Fig. 1 and the smaller blank B' of Fig. 4, and the cutting operations will be described in connection with Fig. 4, it being understood that the cam 23' of Fig. 4 is similar in outline to the pitch curve of the gear teeth to be cut from blank B'.

For cutting teeth in blank B', the cutter shaft 14 is moved upwardly to a position in which the cutting teeth of the projections 11' of the cutter C' clear the upper edge of blank B'. The blank B' is, of course, positioned at a predetermined point, such as with the point P of Fig. 4, which corresponds to the center of one tooth at the base line 47, being positioned along a line extending from the axis of the vertical shaft 15, perpendicularly to the axis of the horizontal cutter shaft 14. Then, the cutter C' is moved downwardly while rotating, between a position corresponding to the position of Fig. 1, i. e., an upper position, in which the axis of shaft 14 and cutter C' is at or slightly above the top of blank B', and a lower position in which the axis of shaft 14 and cutter C' is at or slightly below the bottom of blank B', so as to cut slots in the blank B corresponding partially to the shape of the spaces between the gear teeth to be formed, the cutter teeth 11' at pitch point P cutting to the full depth of line 54 of Fig. 1. Then, the screw 30 is turned to move the slide 20 in the direction of the arrow 43 of Fig. 4, while the shaft 14 and cutter C' are moved downwardly and upwardly between the upper and lower positions described above. Screw head 32 may be rotated from the same drive mechanism as shaft 14, or other suitable driving mechanism may be utilized. During such movement, the tape 38 and guide 39 will cause the cam 23', and the blank B' along with it, to rotate along with the shaft 15, and as each successive peripheral point of the cam 23' reaches a point tangent to the extending ends of tape 38 and the surface of guide 39, this will cause the center line of shaft 15 to move along the line 44 of Fig. 4, while the second slide 21 will move with the cam, but in the direction of arrow 45. It will be observed that during movement from the full line position of Fig. 4 to the dotted position thereof, as shaft 15 reaches the dotted position, the movement will be in the direction of the vector arrow 46, which represents a combination of the movement of the arrows 43 and 45. During this movement, the projections 11' of the cutter C' will cut into the metal of the blank B', with the side of one of the projections, such as the uppermost projections of Fig. 4, cutting to successive points along the dotted line between points 48, 49 and 50, which are on the side of a gear tooth and which points represent the end point, the pitch curve, and the base curve respectively. As will be evident, the sides of the cutter projections 11 will thereby generate the gear teeth from the blank B'.

After as many teeth have been generated as possible for the first position, the blank may be indexed by moving the cutter up to a position above the blank, loosening slightly the tape 38 and turning the blank and cam simultaneously until the surface represented by the points 48, 49 and 50, for instance, will abut against a point on the side of one of the other projections 11', such as that shown lowermost in Fig. 4. Of course, the cutter should be lowered for such positioning, after which the tape 38 may be tightened and the rotation of the cutter started, so that the teeth of the cutter will move into the blank as it is rotated along the path determined by the tape 38, so as to cut additional teeth in the blank. In this manner, the blank may be indexed entirely around, with a number of teeth equal to the number of spaces between the cutting projections 11' being generated at each indexed position. If desired, indexing may be accomplished through a suitable indexing device attached to arm 28 or mounted in any other suitable manner, so that the blank and cam may be moved through the required number of degrees. By making the number of projections on cutter C' equal to the number of teeth to be cut, it would be possible to generate all of the teeth by rotating the cam 23' and blank B' through 360°. However, when the cam is symmetrical about two axes, as when elliptical in form, the projections may equal only half the number of teeth, and the blank alone indexed through 180°, after one-half of the teeth are generated. In any event, since the projections 11' correspond to rack teeth, the motion of the blank B' along an involute curve, i. e., curve 44, will cause the sides of the gear teeth, such as along the line between points 48, 49 and 50, to follow an involute curve. Also, since the tooth sides are generated by a rolling motion along a rack, another gear similarly produced will be provided with teeth which mesh substantially exactly with the teeth of the first gear so produced. As will be evident, gear teeth may be cut in the blank B of Figs. 1–3 in a manner similar to that described in connection with the blank B' of Fig. 4.

It will be understood that other types of cutters, such as a hob, may be utilized, or a single rack cutter, which is merely reciprocated but is not rotated, and that circular gears may be cut. It will also be understood that various sizes and shapes of irregular or non-circular gears may be cut, and that various changes may be made in the apparatus without departing from the spirit and scope of this invention.

What is claimed is:

1. Apparatus for cutting an irregular gear from a blank whose outer surface has a shape corresponding to the ends of the teeth to be cut from the blank, comprising a base; a first slide mounted on said base and movable thereon in either direction along a first longitudinal, horizontal path; a second slide mounted on said first slide and movable thereon in either direction along a horizontal path perpendicular to said first longitudinal path; means for moving said first slide along its path; a vertical shaft mounted for rotation on said second slide; a cam mounted on said shaft and fixed thereto, said cam having a peripheral edge corresponding in shape to the pitch line of the irregular gear to be cut from said blank, said blank being mounted on said shaft and fixed thereto in a corresponding position to said cam; a tape wound around said cam with the opposite ends of said tape extending on the same side of said cam in opposite directions parallel to said first longitudinal path; a support for each end of said tape, the ends of said tape being fixed to said supports; a horizontal cutter shaft mounted with its axis parallel to said first longitudinal path and also mounted for vertical translation; and a rotating cutter mounted on said cutter shaft for cutting teeth from said blank through vertical movement of said cutter shaft and the combined movement of said blank parallel to and perpendicular to said first longitudinal path produced by said tape and said means for moving said first slide.

2. Apparatus for cutting irregular gears, as defined in claim 1, including a vertical post mounted on said second slide; a horizontal arm mounted on said post; and a center mounted on said arm and engaging the upper end of said vertical shaft.

3. Apparatus for cutting irregular gears, as defined in claim 1, including resilient means urging said second slide and cam in a direction toward said cutter.

4. Apparatus for cutting an irregular gear from a blank whose outer surface has a shape corresponding to the ends of the teeth to be cut from the blank, a vertical shaft on which said blank is mounted; a cam mounted on said shaft and fixed thereto, said cam having a peripheral edge corresponding in shape to the pitch line of the irregular gear to be cut from said blank, said blank being mounted on said shaft and fixed thereto in a corresponding position to said cam; means permitting translation of said shaft in any direction perpendicular to the axis thereof; means engaging said cam for forcing said cam to rotate said shaft while successive points on the periphery of said cam follow a straight line which is spaced from and perpendicular to the axis of said shaft; a cutter having at least one tooth corresponding to a tooth of a rack having teeth whose diametral pitch, addendum and dedendum correspond to that of the teeth to be cut from said blank; and means for moving said cutter in a direction parallel to the axis of said shaft, while maintaining the pitch line of the teeth of said cutter parallel to the straight line followed by the successive points of the periphery of said cam.

5. Apparatus for cutting an irregular gear from a blank whose outer surface has a shape corresponding to the ends of the teeth to be cut from the blank, comprising a base; a lower slide mounted on said base and movable thereon in either direction along a first longitudinal, horizontal path; an upper slide mounted on said lower slide and movable thereon in either direction along a horizontal path perpendicular to said first longitudinal path; means for moving said first slide along its path; a vertical shaft mounted for rotation on said upper slide; a cam mounted on said shaft and fixed thereto, said cam having a peripheral edge corresponding in shape to the pitch line of the irregular gear to be cut from said blank, and said blank being mounted on said shaft and fixed thereto in a corresponding position to said cam; a tape wound around said cam with the opposite ends of said tape extending on the same side of said cam in opposite directions parallel to said first longitudinal path; a support for each end of said tape, with the ends of said tape fixed thereto; and a cutter mounted for vertical translation for cutting teeth from said blank through vertical movement of said cutter and the combined movement of said blank parallel to and perpendicular to said first longitudinal path.

6. Apparatus for cutting irregular gears, as defined in claim 5, including a lead screw for moving said lower slide.

7. Apparatus for cutting irregular gears, as defined in claim 5, including a guide bar extending between said tape supports and engageable by the periphery of said cam, said guide bar having a straight surface parallel to the straight portion of said tape.

8. Apparatus for cutting irregular gears, as defined in claim 7, including a spring urging said upper slide and cam in a direction toward said guide bar.

References Cited in the file of this patent

UNITED STATES PATENTS

| | | |
|---|---|---|
| 551,065 | Tyler | Dec. 10, 1895 |
| 1,545,070 | Sears | July 7, 1925 |
| 2,315,068 | Matthews | Mar. 30, 1943 |

FOREIGN PATENTS

| | | |
|---|---|---|
| 531,563 | Great Britain | Jan. 7, 1941 |